UNITED STATES PATENT OFFICE.

CHARLES H. AARON, OF BENTON, CALIFORNIA.

IMPROVEMENT IN THE PROCESSES OF TREATING ORES OF THE PRECIOUS METALS.

Specification forming part of Letters Patent No. 147,542, dated February 17, 1874; application filed November 22, 1873.

*To all whom it may concern:*

Be it known that I, CHARLES H. AARON, of Benton, Mono county, State of California, have invented an Improved Process for the Treatment of Ores; and I do hereby declare the following description and accompanying drawings are sufficient to enable any person skilled in the art or science to which it most nearly appertains to make and use my said invention or improvement without further invention or experiment.

My invention relates to an improved process for treating ores in order to separate the metals from the base portion of the ore.

By my process, the pulverized ore, either in the raw state or after roasting or calcination, is treated, prior to amalgamation, in a suitable vessel, with a watery solution of sulphurous acid, $SO_2$, with or without the addition of any or all of the following substances: First, common salt; second, chlorine; third, oxide or carbonate of copper or of iron; fourth, sulphates or chlorides of copper; fifth, atmospheric air; and is then submitted to amalgamation with quicksilver, with or without metallic copper, or iron, or lead, or zinc, or an amalgam of copper, lead, or zinc, by any of the usual means; or the treatment of the ore with sulphurous acid may be simultaneous with amalgamation.

A solution of sulphurous acid in water acts upon certain metallic sulphides and oxides or carbonates, as those of zinc, copper, and iron, forming soluble salts of the metals, which, in presence of common salt or other similar chloride, become chlorides of the metals, and these, with excess of air, become perchlorides, either directly or by inter-reaction one with another; and the chlorides and perchlorides so formed attack certain sulphides which are not directly acted on by sulphurous acid.

With chlorine, in presence of water or steam, sulphurous acid forms hydrochloric acid and sulphuric acid.

Sulphurous acid is also useful for the purpose of neutralizing carbonate of lime, which sometimes exists in ores, and so preventing it from interfering with the desired action of chemicals commonly used in amalgamation, such as sulphate of copper.

In carrying out my process, I proceed substantially as follows: The pulverized ore is put into a wooden barrel, differing from the common "Frieberg barrel" only in having a steam-pipe entering through one of its journals. A watery solution of sulphurous acid is then added in quantity sufficient to moisten the ore, so as to make a pulp of proper consistency for amalgamation. About five per cent. of salt is also added. A quantity of metallic copper in balls, or pieces of bar-copper, is put into the barrel with the ore, which is then closed and put in motion, (revolving.) Steam is introduced through the journal. After several hours, the barrel is stopped and opened, and a quantity of quicksilver is put in, the quantity being proportioned to the richness of the ore, as in all amalgamating processes. The pulp in the barrel should be boiling hot before the quicksilver is put in. It will then not need more steaming. The barrel, being again put in motion, is kept revolving at the rate of from ten to twenty revolutions per minute during as many hours as may be requisite, varying from twelve to twenty hours. It is then stopped and its contents emptied into a trough, which conducts the pulp and quicksilver into a wooden tub provided with a stirrer or muller. Water is added, flowing in a constant stream into this tub; and, by withdrawing plugs from holes in the side of this tub, the water and earthy matters are permitted to flow out, while the quicksilver and amalgam of silver remain at the bottom of the tub, and, being afterward taken out, the silver amalgam is retorted in the usual way to drive off quicksilver, and the silver is ready for melting into bars.

The balls of copper are either retained in the barrel by means of the grating in the discharge-hole, or are gathered up and replaced in the barrel with a new charge of ore.

In case the ore contains no oxide or carbonate of copper, I add a quantity of either of these to produce the required effect.

The process may be modified by causing the fumes or gaseous sulphurous acid to pass into the pulp after adding simple water. The effect is the same.

Having thus described my invention, what I claim as new, and desire to secure by Letters Patent, is—

The process of treating ores with sulphurous acid, $SO_2$, preparatory to extracting metals from them by amalgamation.

In witness whereof I hereunto set my hand and seal.

CHARLES H. AARON. [L. S.]

Witnesses:
  D. E. HUNTER,
  E. R. MINER.